(12) United States Patent
Chen

(10) Patent No.: US 8,979,344 B2
(45) Date of Patent: Mar. 17, 2015

(54) BACKLIGHT MODULE USING LASER EMITTERS AS LIGHT SOURCE

(71) Applicant: Hon Hai Precision Industry Co., Ltd., New Taipei (TW)

(72) Inventor: Po-Chou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/873,142

(22) Filed: Apr. 29, 2013

(65) Prior Publication Data

US 2014/0177273 A1   Jun. 26, 2014

(30) Foreign Application Priority Data

Dec. 24, 2012   (TW) .............................. 101149435 A

(51) Int. Cl.
*F21V 7/04* (2006.01)
*F21V 8/00* (2006.01)

(52) U.S. Cl.
CPC ............ *G02B 6/0035* (2013.01); *G02B 6/0096* (2013.01); *G02B 6/0053* (2013.01); *G02B 6/0068* (2013.01)
USPC ......................................... 362/609; 362/633

(58) Field of Classification Search
CPC .. G02B 6/0025; G02B 6/0031; G02B 6/0068; G02F 1/133608

USPC .............. 362/609, 633, 602, 97.1, 97.2, 97.3, 362/623, 624; 349/65
See application file for complete search history.

(56) References Cited

U.S. PATENT DOCUMENTS

| | | | | |
|---|---|---|---|---|
| 4,798,448 A | * | 1/1989 | van Raalte | 349/62 |
| 5,044,734 A | * | 9/1991 | Sperl et al. | 349/67 |
| 6,295,162 B1 | * | 9/2001 | Miyata | 359/453 |
| 6,646,813 B2 | * | 11/2003 | Falicoff et al. | 359/641 |
| 2005/0207157 A1 | * | 9/2005 | Tani | 362/244 |
| 2006/0018129 A1 | * | 1/2006 | Tang | 362/615 |
| 2007/0024976 A1 | * | 2/2007 | Schluchter et al. | 359/497 |
| 2011/0026274 A1 | * | 2/2011 | Bourdelais et al. | 362/613 |
| 2011/0228195 A1 | * | 9/2011 | Shikii et al. | 349/62 |
| 2012/0176772 A1 | * | 7/2012 | Maekawa et al. | 362/97.1 |

* cited by examiner

*Primary Examiner* — Anh Mai
*Assistant Examiner* — Glenn Zimmerman
(74) *Attorney, Agent, or Firm* — Novak Druce Connolly Bove + Quigg LLP

(57) ABSTRACT

A backlight module includes a laser light source and a light guide plate. The light source locates beside a side surface of the light guide plate. The light guide plate comprises a plurality of transflective films arranged along a direction in alignment the laser light source. When the light from the laser light source emits to the transflective films, a part of the light passes through the transflective films and transmits along a same direction, and another part of the light is reflected by the transflective films and emits into a light diffusion plate. The light beams reflected by the transflective films and into the light diffusion plate have the same intensity.

13 Claims, 4 Drawing Sheets

BACKLIGHT MODULE USING LASER EMITTERS AS LIGHT SOURCE

BACKGROUND

1. Technical Field

The disclosure generally relates to a backlight module, and especially relates to a backlight module with fewer light sources, wherein each light source includes laser emitters.

2. Description of Related Art

In recent years, due to excellent light quality and high luminous efficiency, light emitting diodes (LEDs) have increasingly been used as substitutes for incandescent bulbs, compact fluorescent lamps and fluorescent tubes as light sources of illumination devices.

Light emitting diodes can be used as light sources in a direct-type LED backlight module. Generally, the light emitting diodes are arranged in a matrix, secondary optical lenses are located over the light emitting diodes for increasing the emitting angles of the light beams from the LEDs and a diffusing plate is located over the secondary optical lens for uniformly mixing the light beams from the secondary optical lens, whereby the light beams can be uniformly output to illuminate an LCD (light crystal display). However, in the direct-type LED backlight module described above, the number of the light emitting diodes is relatively huge, thereby increasing the cost of the direct-type LED backlight module.

What is needed, therefore, is a backlight module to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments of a backlight module will now be described in detail below and with reference to the drawings.

Figure 1:
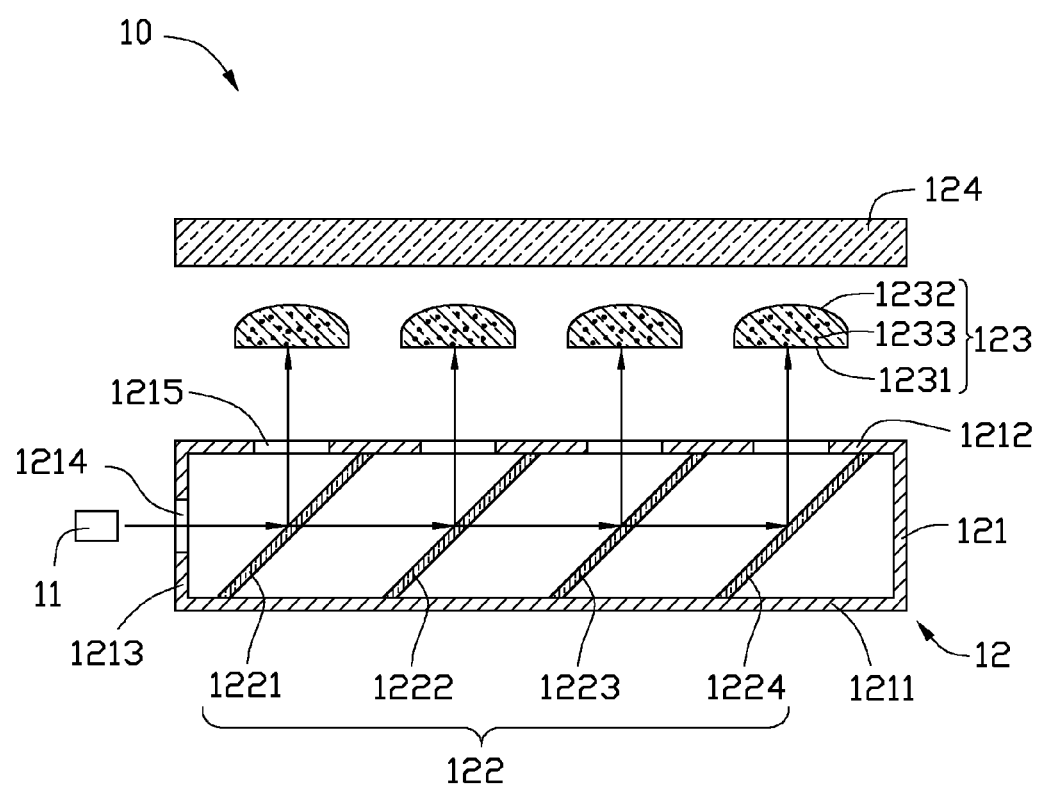
FIG. 1 is an illustrating cross-sectional view of a backlight module in accordance with a first embodiment of the present disclosure.

Referring to FIG. 1, a backlight module 10 in accordance with an embodiment is provided. The backlight module 10 includes a light source 11 and a light guide plate 12.

Figure 2:
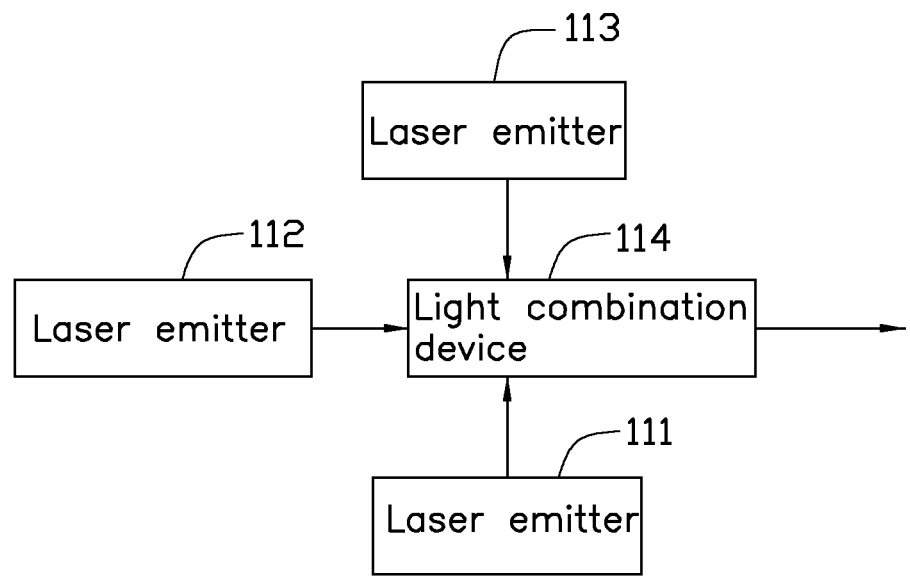
FIG. 2 is a diagrammatic view of a light source in FIG. 1.

The light source 11 is located beside a side surface of the light guide plate 12. Light from the light source 11 emits into the light guide plate 12 from the side surface thereof, and emits out of the light guide plate 12 from an upper surface of the light guide plate 12. Referring to FIG. 2, in this embodiment, the light source 11 includes a first laser emitter 111, a second laser emitter 112, a third laser emitter 113 and a light combination device 114. The first laser emitter 111 emits a red light beam, the second laser emitter 112 emits a green light beam, and the third laser emitter 113 emits a blue light beam. The light beams from the first laser emitter 111, the second laser emitter 112 and the third laser emitter 113 are mixed in the light combination device 114 to become a white light beam which emits from the light combination device 114 toward the light guide plate 12. In this embodiment, the light combination device 114 is an X-prism consisting of four triangular prisms.

The light guide plate 12 includes a frame 121, a plurality of transflective films 122, and a plurality of light diffusion elements 123 positioned over the frame 121. The light diffusion elements 123 function as the secondary optical lenses of the conventional direct-type LED backlight module.

The frame 121 has a bottom plate 1211, a cover 1212 and side plates 1213 formed between the bottom plate 1211 and the cover 1212. The transflective films 122 are positioned between the bottom plate 1211 and the cover 1212. The side plate 1213 defines a light incident hole 1214 in a position corresponding to and in alignment with the light source 11. Light from the light source 11 emits into the light guide plate 12 through the light incident hole 1214 in the side plate 1213. The cover 1212 defines a plurality of light emitting holes 1215. Each of the light emitting holes 1215 is located directly above one of the transflective films 122. Each of the transflective films 122 can reflect a certain part of the white light from the light source 11 to direct it to move toward the light diffusion element 123 through a corresponding one of the light emitting holes 1215.

The transflective films 122 are arranged along a direction away from the light source 11 and in alignment therewith. In this embodiment, the transflective films 122 are arranged in a uniform interval from each other. When light from the light source 11 emits to one of the transflective films 122, a part of the light passes through the transflective film 122 and transmits along the same direction, and another part of the light is reflected by the transflective film 122 and emits to the corresponding light diffusion element 123. Preferably, the transflective films 122 are made of metal films with a high reflectivity. The metal films can be made of aluminum (Al) or silver (Ag). The transflective films 122 are paralleled to each other, and an included angle between each of the transflective films 122 and the light emitting direction of the white light beam from the light source 11 is about 45 degrees. In this embodiment, the transflective films 122 include a first transflective film 1221, a second transflective film 1222, a third transflective film 1223 and a fourth transflective film 1224. The first to fourth transflective films 1221, 1222, 1223, 1224 are arranged in sequence away from the light source 11. The first transflective film 1221 is relatively adjacent to the light source 11, and the fourth transflective film 1224 is relatively away from the light source 11. Preferably, a reflectivity of the first transflective film 1221 is about ¼, and a transmissivity of the first transflective film 1221 is about ¾; a reflectivity of the second transflective film 1222 is about ⅓, and a transmissivity of the second transflective film 1222 is about ⅔; a reflectivity of the third transflective film 1223 is about ½, and a transmissivity of the third transflective film 1223 is about ½; a reflectivity of the fourth transflective film 1224 is about 1, and a transmissivity of the fourth transflective film 1224 is about 0. By such arrangement, the part of the light being reflected by each of the first to fourth transflective films 1221, 1222, 1223, 1224 to reach the light diffusing element 123 will have a same light intensity. Actually, the number of the transflective films 122 can be changed as necessary. If the number of the transflective films 122 is N, wherein N is a nature number (positive integer), a reflectivity $R_i$ and a transmissivity $T_i$ of an i-th transflective film 122 can be calculated as following equation:

$$R_i=1/(N-i+1); T_i=(N-i)/(N-i+1)$$

wherein the i-th transflective film 122 means there are (i−1) transflective films located between the i-th transflective film 122 and the light source 11, i is also a nature number and i is less than or equal to N.

The light diffusion elements 123 are located above the transflective films 122. In this embodiment, the light diffusion elements 123 are formed over the light emitting holes 1215 to receive light reflected by the transflective films 122. Each of the light diffusion element 123 has a light incident surface 1231 and a light emitting surface 1232. Light reflected by the transflective films 122 emits into the light diffusion elements 123 through the light incident surfaces 1231 and emits out of the light diffusion elements 123 through the light emitting surfaces 1232. The light diffusion elements 123 are configured to diffuse the light reflected by the transflective films 122 and enlarge a light emitting angle. Preferably, a plurality of diffusing particles 1233 is located between the light incident surface 1231 and the light emitting surface 1232. Furthermore, the light emitting surface 1232 can be a rough surface to further diffuse the light.

In addition, the light guide plate 12 can further include a light diffusion plate 124. The light diffusion plate 124 is located over the light diffusion elements 123 to further diffuse the light thereby forming a uniform light distribution for illuminating the LCD.

In the backlight module 10 described above, a plurality of transflective films 122 are arranged along a direction in alignment with the light source 11. When the light from the light source 11 emits to one of the transflective films 122, a part of the light passes through the transflective film 122 and transmits along the same direction, and another part of the light is reflected by the transflective film 122 and emits to the light diffusion element 123. Therefore, only one light source 11 is needed to achieve the lighting of a line. Therefore, the number of the light sources 11 used in the backlight module can be decreased, since each light source 11 as shown in FIG. 1 of the present disclosure can replace four LEDs of the conventional direct-type LED backlight module.

Figure 3:
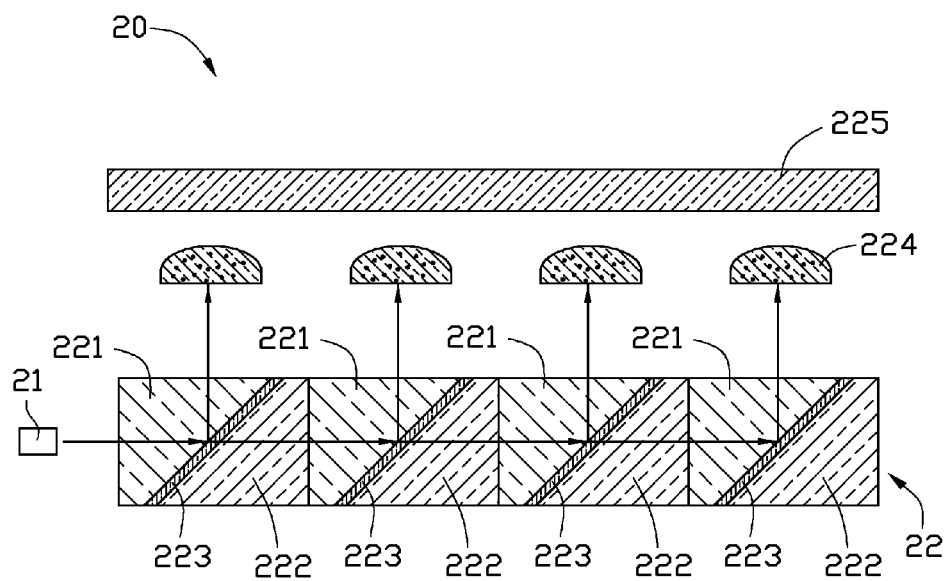
FIG. 3 is an illustrating cross-sectional view of a backlight module in accordance with a second embodiment of the present disclosure.

Referring to FIG. 3, a backlight module 20 in accordance with a second embodiment is provided. The backlight module 20 includes a light source 21 and a light guide plate 22.

The light source 21 is located beside a side surface of the light guide plate 22. Light from the light source 21 emits into the light guide plate 22 through the side surface thereof, and emits out of the light guide plate 22 from an upper surface thereof. The structure of the light source 21 is similar to the light source 11.

Figure 4:
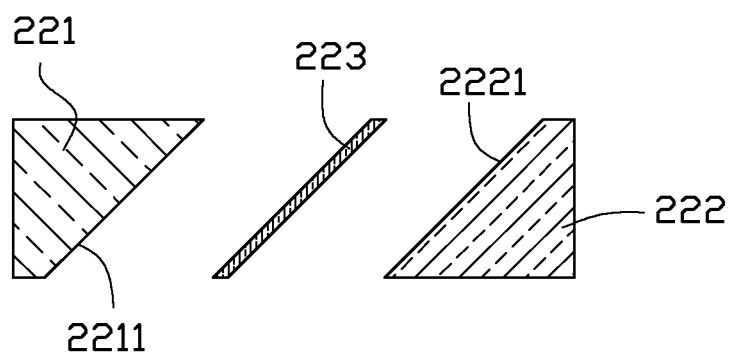
FIG. 4 is an illustrating cross-sectional view of a part of a light guide plate in FIG. 3, wherein elements constituting the part of the light guide plate are separated from each other for clarity.

Referring also to FIG. 4, the light guide plate 22 includes first clamp portions 221, second clamp portions 222, a plurality of transflective films 223 located between the first clamp portions 221 and the second clamp portions 222, and light diffusion elements 224 formed above the transflective films 223. The first clamp portions 221 and the second clamp portions 222 are made of transparent materials. Each of the first clamp portions 221 has a first side surface 2211, and each of the second clamp portions 222 has a second side surface 2221. Each one of the transflective films 223 is clamped between the first side surface 2211 of the corresponding first clamp portion 221 and the second side surface 2221 of the corresponding second clamp portion 222. The structure and arrangement of the transflective films 223 are similar to the structure and arrangement of the transflective films 122 in the first embodiment. When light from the light source 11 emits to one of the transflective films 223 located between the first clamp portion 221 and the second clamp portion 222, a part of the light passes through the transflective film 223 and transmits along the same direction, and another part of the light is reflected by the transflective film 223 and emits to the light diffusion element 224.

In addition, the light guide plate 22 can further include a light diffusion plate 225. The light diffusion plate 225 is located over the light diffusion elements 123 to further diffuse the light and form a uniform light distribution.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A backlight module, comprising:
   a laser light source for generating light; and
   a light guide plate, the laser light source being located beside a side surface of the light guide plate, the light guide plate comprising a light diffusion plate and a plurality of transflective films arranged along a direction in alignment with the laser light source, when the light from the laser light source emits to the transflective films, a part of the light passing through the transflective films and transmitting along a same direction, another part of the light being reflected by the transflective films to reach the light diffusion plate, except the one of the transflective films which is located most distant from the laser light source, the most distant transflective film only reflecting the part of the light incident thereon to direct the part of the light incident thereon to totally reach the light diffusion plate;
   the light guide plate comprises a frame, the frame comprises a bottom plate, a cover and a side plate connected between the bottom plate and the cover, the transflective films are positioned between the bottom plate and the cover, the side plate defines a light incident hole in a position corresponding to the laser light source, and the cover defines a plurality of light emitting holes directly over the transflective films, respectively.

2. The backlight module of claim 1, wherein a reflectivity $R_i$, and a transmissivity $T_i$, of an i-th transflective film can be calculated as following equation:

$$R_i=1/(N-i+1); T_i=(N-i)/(N-i+1)$$

wherein N represents a number of the transflective films, the i-th transflective film means that there are (i-1) transflective films located between the i-th transflective film and the laser light source, the i and N are positive integer numbers, and i is less than or equal to N.

3. The backlight module of claim 1, wherein the transflective films are paralleled to each other.

4. The backlight module of claim 3, wherein an included angle between the transflective film and a light emitting direction of the laser light source is about 45 degrees.

5. The backlight module of claim 1, wherein the laser light source comprises laser emitters.

6. The backlight module of claim 5, wherein the laser light source comprises a first laser emitter, a second laser emitter, a third laser emitter and a light combination device, the first laser emitter emits a red light beam, the second laser emitter emits a green light beam, and the third emitter emits a blue light beam, the light beams from the first laser emitter, the second laser emitter and the third laser emitter are mixed in the light combination device to become a white light beam.

7. The backlight module of claim 6, wherein the light combination device is an X-prism.

8. The backlight module of claim 1, wherein the light guide plate further comprises light diffusing elements, and each of the light diffusion elements is located directly above a corresponding one of the transflective films.

9. The backlight module of claim 8, wherein each of the light diffusion elements comprises a light incident surface and a light emitting surface, the part of the light reflected by the corresponding one of the transflective films emits into the light diffusion element through the light incident surface, and emits out of the light diffusion element through the light emitting surface.

10. The backlight module of claim 9, wherein a plurality of diffusing particles are doped in each of the light diffusion elements, and the diffusing particles are located between the light incident surface and the light emitting surface.

11. The backlight module of claim 10, wherein the light emitting surface of the light diffusion element is a rough surface.

12. The backlight module of claim 1, wherein the part of the light reflected from each transflective film and reaching the light diffusion plate has a same light intensity.

13. The backlight module of claim 1, wherein the light guide plate comprises a first clamp portion and a second clamp portion, the first clamp portion and the second clamp portion are made of transparent materials, the first clamp portion has a first side surface, the second clamp portion has a second side surface facing towards the first side surface, and each of the transflective films is located between the first side surface and the second side surface.

* * * * *